United States Patent
Ilan et al.

(10) Patent No.: US 6,668,081 B1
(45) Date of Patent: *Dec. 23, 2003

(54) PATTERN RECOGNITION SYSTEM

(75) Inventors: Gabriel Ilan, Tel-Aviv (IL); Arie Kadosh, Naharia (IL)

(73) Assignee: Art Advanced Recognition Technologies Inc., Simi Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/284,951

(22) PCT Filed: Oct. 26, 1997

(86) PCT No.: PCT/IL97/00341

§ 371 (c)(1),
(2), (4) Date: Jun. 22, 1999

(87) PCT Pub. No.: WO98/19292

PCT Pub. Date: May 7, 1998

(30) Foreign Application Priority Data

Oct. 27, 1996 (IL) .................................................. 119498

(51) Int. Cl.[7] .................................................. G06K 9/00
(52) U.S. Cl. ........................ 382/187; 382/119; 382/188; 382/209; 382/218; 382/315; 178/18.03; 345/173
(58) Field of Search ............................... 382/181, 186, 382/187, 188, 189, 185, 209, 218, 219, 229, 305, 310, 313, 315, 115, 116, 119, 120; 178/18.03, 18.06; 345/156, 157, 173; 235/379, 380

(56) References Cited

U.S. PATENT DOCUMENTS

| | | | |
|---|---|---|---|
| 5,157,737 A | 10/1992 | Skarlew ...................... | 382/315 |
| 5,260,697 A | 11/1993 | Barrett et al. ................ | 345/173 |
| 5,297,216 A * | 3/1994 | Sklarew ....................... | 382/189 |
| 5,327,161 A | 7/1994 | Logan et al. ................ | 345/157 |
| 5,382,777 A | 1/1995 | Yuhara et al. ............... | 235/379 |
| 5,406,310 A * | 4/1995 | Aschenbrenner et al. ... | 345/602 |
| 5,454,046 A | 9/1995 | Carman, II .................. | 382/186 |
| 5,481,625 A | 1/1996 | Suzuki ........................ | 382/187 |
| 5,502,803 A * | 3/1996 | Yoshida et al. ............. | 707/530 |
| 5,568,604 A | 10/1996 | Hansen ........................ | 345/863 |
| 5,680,470 A | 10/1997 | Moussa et al. .............. | 382/119 |
| 5,745,598 A | 4/1998 | Shaw et al. .................. | 382/209 |
| 5,781,663 A * | 7/1998 | Sakaguchi et al. .......... | 382/189 |

FOREIGN PATENT DOCUMENTS

EP 0593386 A2 4/1994

* cited by examiner

Primary Examiner—Daniel G. Mariam
(74) Attorney, Agent, or Firm—Eitan, Pearl, Latzer & Cohen Zedek, LLP.

(57) ABSTRACT

A touchpad pointing device utilized as a pattern input device for a pattern recognition system. The input pattern received from the touchpad pointing device is translated into a start application command. The recognition system forms part of a computer having an operating system and includes a touchpad pointing device, a recognition module and a signal capturer. In addition, a unit for launching an application to run on a computer having an operating system and a pointing device which produces an input pattern in response to movement upon it, is described. The unit includes a recognition module and a launcher. The recognition module attempts to recognize the input pattern as a previously trained launching pattern. The launcher launches the application by providing a launching command which is associated with the launching pattern to the operating device. A security application enables access to the computer upon receipt of an input signature from a user with access privileges.

10 Claims, 7 Drawing Sheets

PATTERN RECOGNITION SYSTEM

FIELD OF THE INVENTION

The present invention relates to touchpad pointing devices generally and to their use for inputting a pattern to be recognized.

BACKGROUND OF THE INVENTION

Cursor pointing devices for computers are known in the art, the most common of which is a mouse. Typically, "mice" were peripheral devices kept on the side of the computer and often required a pad along which to slide. With the popularity of laptop computers and their continual reductions in size and weight, other types of mice have been produced. For example, there are mini trackballs which are located in the middle of the keyboard and which are operated through pressure.

FIG. 1, to which reference is now made, illustrates a laptop computer 10 with a further type of cursor pointing device 12, known as a touchpad pointing device, and two selecting buttons 14. Although not shown, touchpad pointing devices can also be implemented as external devices connectable to a laptop or desktop computer.

The touchpad pointing device 12 typically is a flat pad which identifies the location of a finger, labeled 16, thereon relative to the edges of the pad or to the previous position of finger 16. The touchpad pointing device 12 also includes hardware (not shown) which translates the relative position to a position on the screen. Thus, as the finger 16 sketches a curve 20 on touchpad pointing device 12, a cursor 22 follows a similar curve 24 on a screen 26 of laptop computer 10.

When the user has brought cursor 22 to a desired location, such as above the word "FILE" as shown, he executes the action by either pressing one of buttons 14 or tapping on touchpad pointing device 12.

SUMMARY OF THE PRESENT INVENTION

The present invention utilizes touchpad pointing devices as pattern input devices. This is accomplished without changing any aspect of the operation of the touchpad pointing devices themselves. Furthermore, the present invention translates the input pattern received from a touchpad pointing device into a start application command.

There is therefore provided, in accordance with a preferred embodiment of the present invention, a recognition system forming part of a computer having an operating system. The recognition system includes a touchpad pointing device, a recognition module and a signal capturer. The touchpad pointing device produces an input pattern in response to movement thereon. The recognition module receives the input pattern and attempts to recognize the input pattern. The signal capturer captures the input pattern from the touchpad pointing device and provides it to the recognition module if so activated. The input pattern can be a gesture, a letter, a signature or any other pattern.

There is also provided, in accordance with a second preferred embodiment of the present invention, a unit for launching an application to run on a computer having an operating system and a pointing device which produces an input pattern in response to movement thereon. The unit includes a recognition module and a launcher. The recognition module receives the input pattern and attempts to recognize the input pattern as a previously trained launching pattern. The launcher captures the input pattern from the pointing device, provides it to the recognition module if so activated and provides a launching command which is associated with the launching pattern to the operating device, thereby to launch an application.

There is still further provided, in accordance with a third preferred embodiment of the present invention, a security system for a computer which includes a security application, a touchpad pointing device, a recognition module and a signal capturer. The security application enables access to the computer upon receipt of an input signature from a user with access privileges. The touchpad pointing device produces an input signature in response to movement thereon. The recognition module receives the input signature, attempts to recognize the input pattern as similar to at least one trained signature associated therewith and provides a recognition result to the security application. The signal capturer captures the input signature from the touchpad pointing device and provides it to the recognition module if so activated by the security application.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
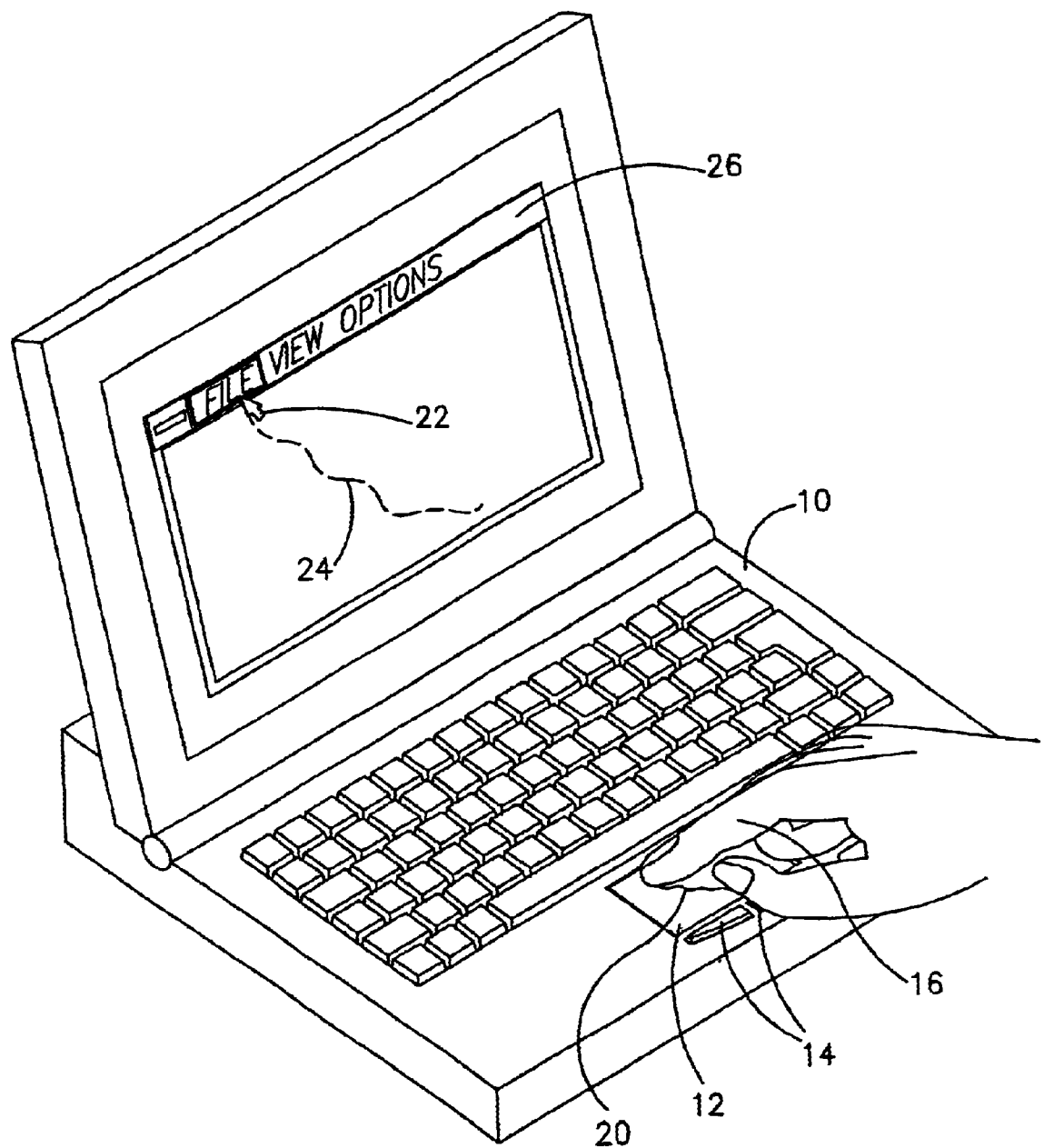
FIG. 1 is a schematic illustration of a prior art touchpad pointing device forming part of a laptop computer.
Figure 2A:
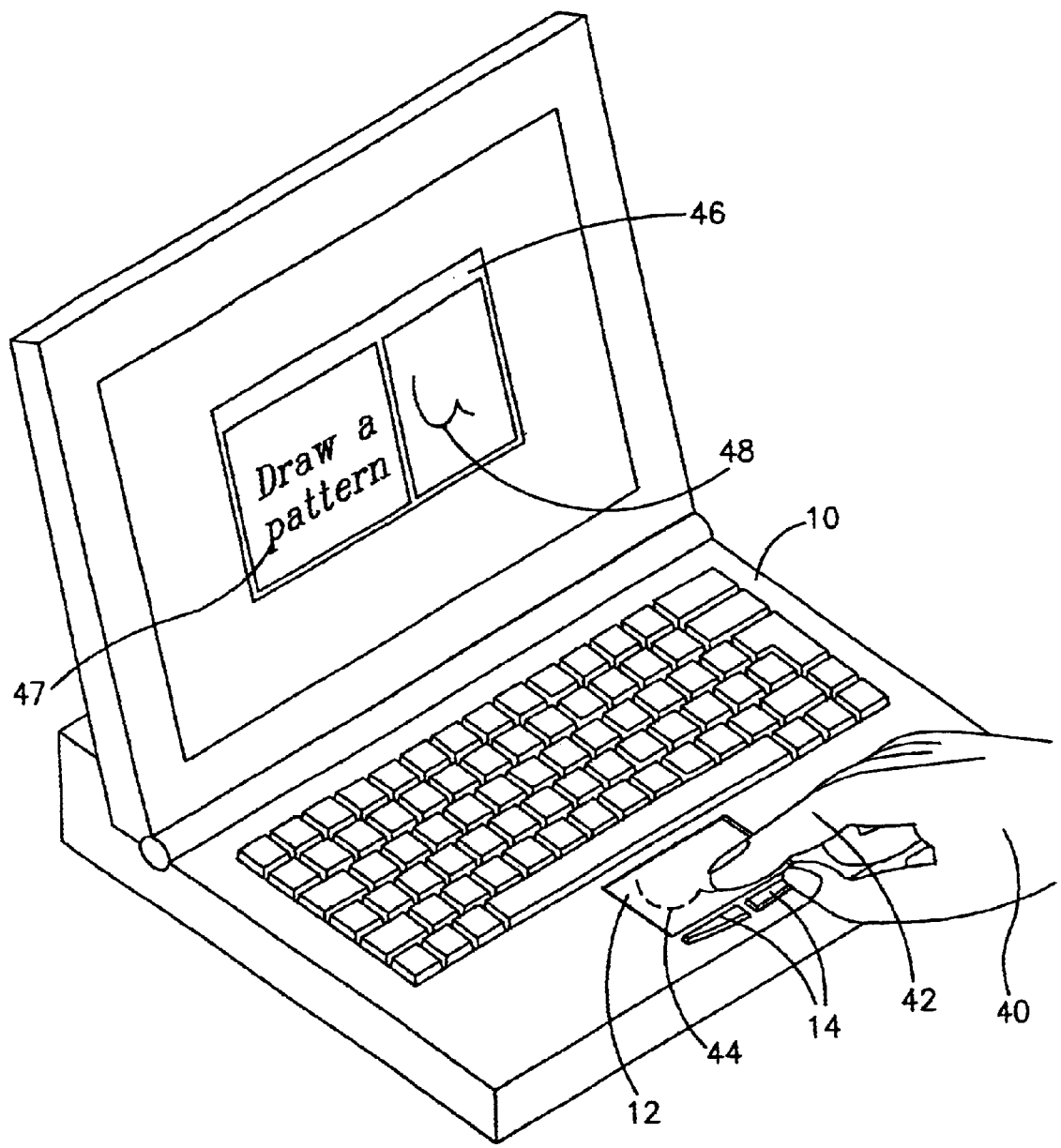
FIGS. 2A and 2B are schematic illustrations of a touchpad pointing device utilized as a pattern input device, constructed and operative in accordance with a preferred embodiment of the present invention, wherein in FIG. 2A the touchpad pointing device forms part of a laptop computer and in FIG. 2B the touchpad pointing device is an external element connected to a desktop computer.
Figure 2B:
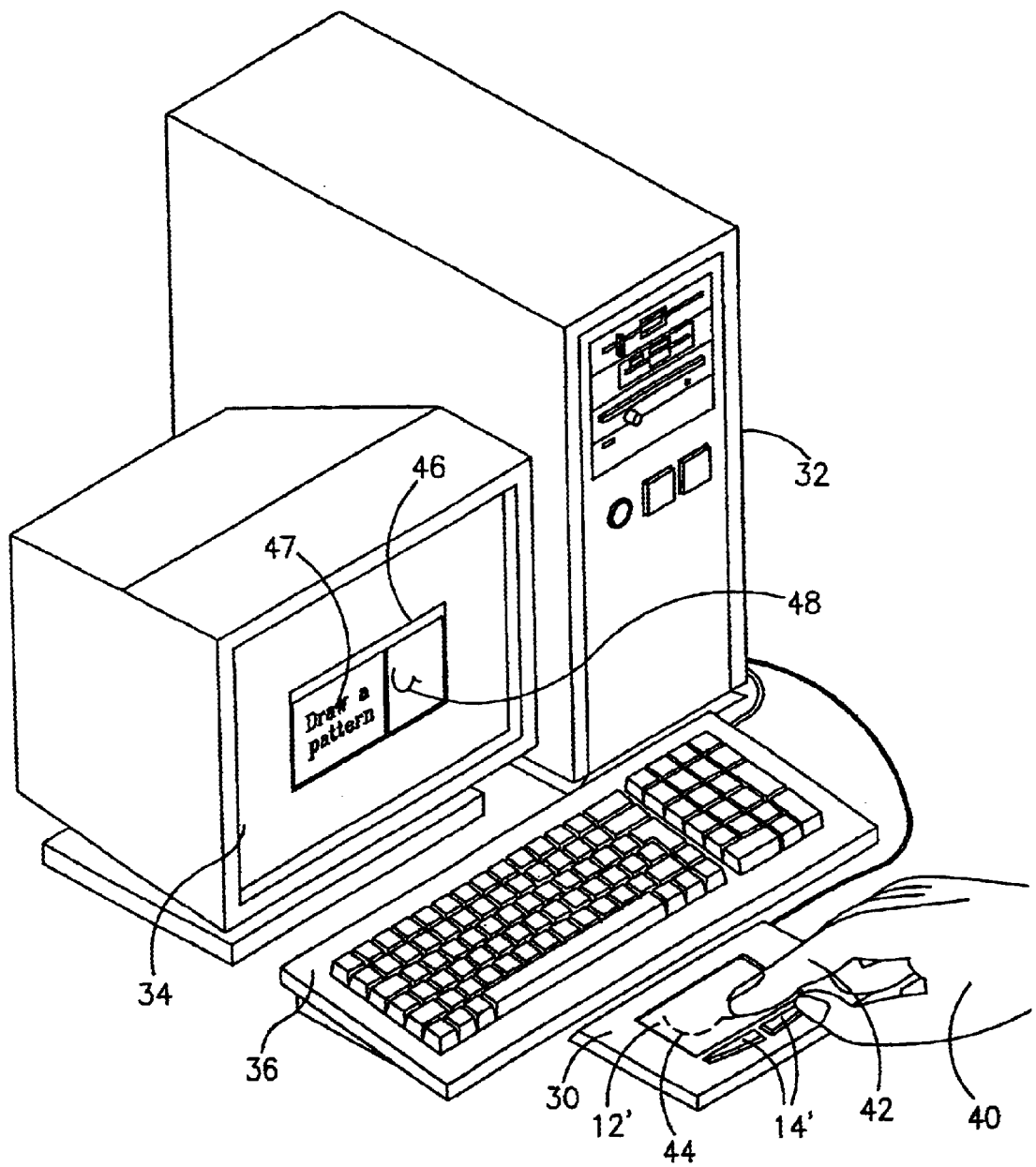

Reference is now made to FIGS. 2A and 2B which illustrate a touchpad pointing device utilized as a pattern input device, constructed and operative in accordance with a preferred embodiment of the present invention. Elements which are similar to those of FIG. 1 carry similar reference numerals. FIG. 2A shows the touchpad pointing device 12 as part of laptop computer 10 and FIG. 2B shows the touchpad pointing device, labeled 12', and buttons 14' as an external element 30 connected to a desktop computer 32 having a monitor 34 and keyboard 36. For the purposes of the present invention, both touchpad pointing devices 12 and 12' operate in the same way and, therefore, will be described together.

In accordance with a preferred embodiment of the present invention, touchpad pointing devices 12 and 12' are utilized to create patterns to be recognized. This is accomplished without changing any aspect of the operation of the touchpad pointing devices 12 and 12' themselves.

FIGS. 2A and 2B show a hand 40 whose finger 42 sketches a pattern 44 on the associated touchpad pointing device 12 or 12'. FIGS. 2A and 2B also show a dialog box 46 of a pattern recognition application (not shown) which displays a command 47, such as "Draw a Pattern", and the pattern 48 received thereby. Thus, in accordance with a preferred embodiment of the present invention, the movement of finger 42 inputs a pattern rather than moving the cursor as in the prior art.

The pattern recognition application can be any suitable recognition application, such as those described in U.S. patent application Ser. Nos. 08/282,187 (now abandoned), 07/978,578 (now abandoned), 08/528,293 (now U.S. Pat. No. 6,023,509 issued Feb. 8, 200), 08/428,806 (now U.S. Pat. No. 5,774,582 issued Jun. 30, 1998), all assigned to the common assignee of the present invention and incorporated herein by reference, which receives the input pattern 48 and translates it into a character, or set of characters, of a known character set, such as the ASCII character set. For example, the pattern shown in FIGS. 2A and 2B might be translated into the letter "W". Although not shown, it will be appreciated that multiple character patterns can also be produced on touchpad pointing devices 12 and 12'.

In accordance with a preferred embodiment of the present invention, devices 12 and 12' operate both as pointing devices and as pattern input devices. Typically, an activation signal must be provided to convert devices 12 and 12' from one state to the next. The activation signal can be any hot-key, such as the control key, a menu selection, a voice command or a hand-written pattern.

Figure 3:
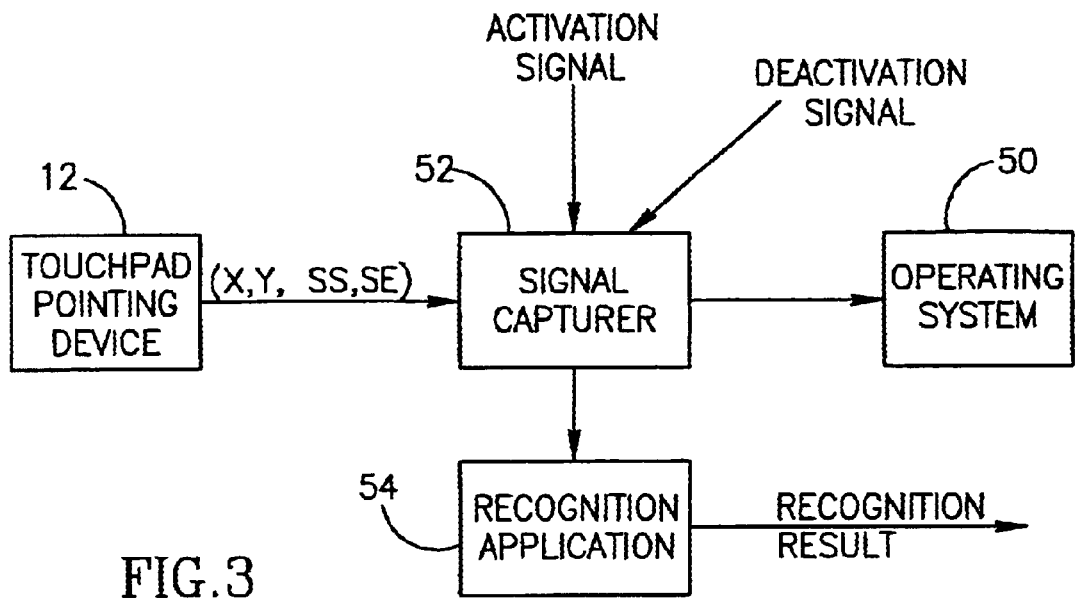
FIG. 3 is a block diagram illustration of the elements of the computer system required to provide the operation shown in FIGS. 2A and 2B.

FIG. 3, to which reference is now made, illustrates the elements of the computer system, laptop, desktop, palmtop or personal digital assistant (PDA), which enable the devices 12 and 12' to operate in two modes. FIG. 3 shows the touchpad pointing device 12 and an operating system 50 to which the output of pointing device 12 is directly provided in the prior art. In accordance with a preferred embodiment of the present invention, the computer system also comprises a signal capturer 52 which acts between pointing device 12 and operating system 50, capturing the output of pointing device 12 (the (x,y) locations along the path and the start and stop indications, SS and SE respectively) as well as the activation signal. For cursor pointing device operation, signal capturer 52 provides the output of pointing device 12 directly to operating system 50. However, after receipt of the activation signal, signal capturer 52 provides the output of pointing device 12 to a recognition application 54 which produces a recognition result. Signal capturer 52 will continue to do so until receiving a deactivation signal, which can be a hot-key operation, a menu operation, or the closing of the recognition application 54.

It will be appreciated that the redirection operation of signal capturer 52 can be a feature of the operating system 50. In this situation, the activation signal is provided directly to operating system 50 which then provides the input pattern directly to the recognition application 54.

In accordance with a further preferred embodiment of the present invention, the system of FIG. 3 is operative to provide security to the computer. In this embodiment, the input pattern is the user's personal signature which he signs on the touchpad pointing device 12. After receiving an activation signal from an external application, such as a security application or a screen saver which requires a password to stop the screen saving action, the signal capturer 52 waits for input from the user and redirects the input pattern to the recognition application 54. Recognition application 54 includes therein at least one trained personal signature and attempts to match the input pattern with the trained signatures associated therewith. Recognition application 54 provides the recognition result to the application which provided the activation signal which, in turn, enables access to the computer only if the recognition result was positive.

In accordance with a second preferred embodiment of the present invention, the input pattern, received from a touchpad pointing device or from any other type of pointing device, is translated into a launch application command. Thus, a user can write a word, a gesture, or a simple character of his choosing with the pointing device and thereby launch an application. For example, the almost W-shaped pattern 48 of FIGS. 2A and 2B might launch a word processing application.

Figure 4:
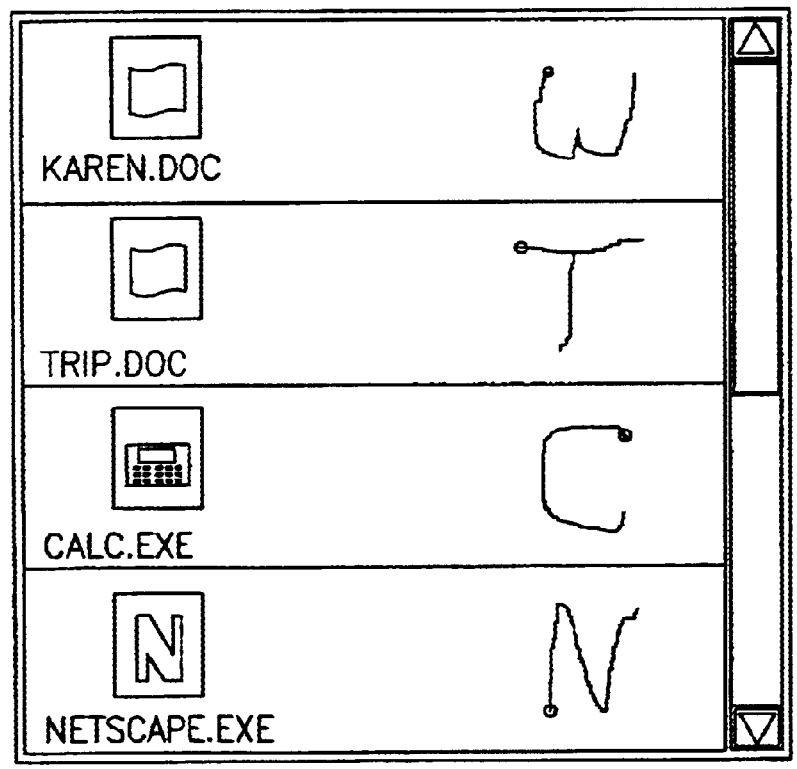
FIG. 4 is a schematic illustration of a translation from an input pattern to a start application command.

FIG. 4 illustrates an exemplary set of patterns and their associated commands. For example, the handwritten W or w will cause a file called "Karen.doc" to be edited. The handwritten T causes a different file, "Trip.doc" to be edited. The handwritten C launches a calculator program and the handwritten N launches the Navigator™ browser, commercially available from Netscape Communications Corporation of California, USA.

Figure 5:
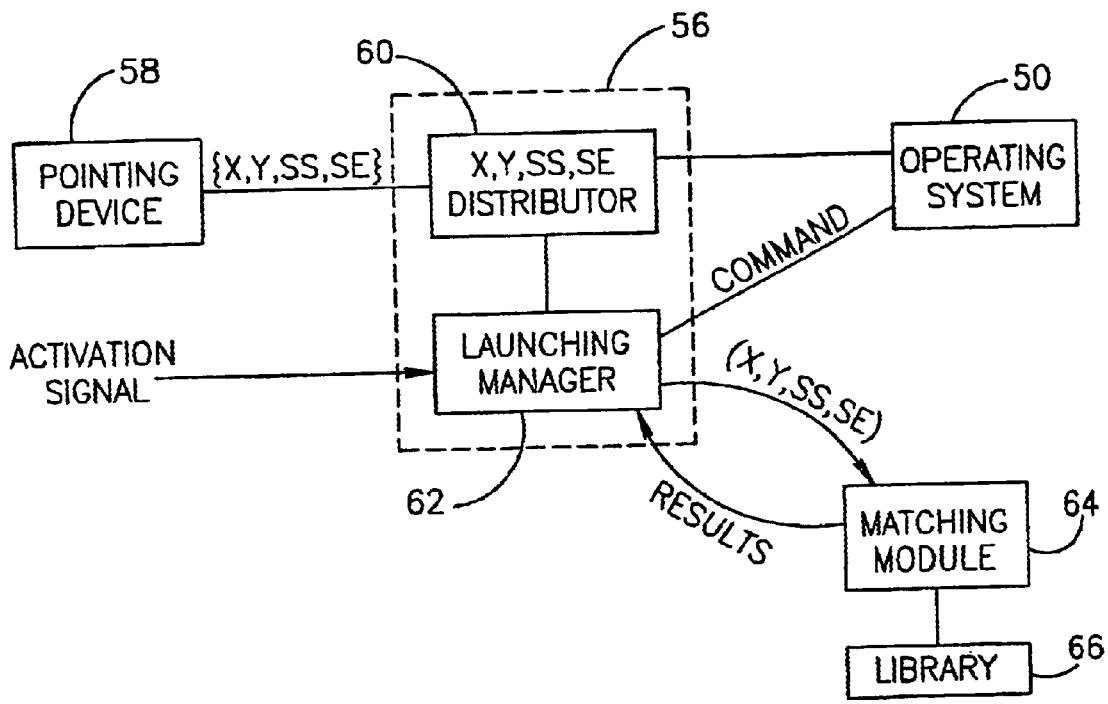
FIG. 5 is a block diagram illustration of an application launcher system, constructed and operative in accordance with a preferred embodiment of the present invention, which utilizes pattern input from a pointing device.

The system to perform this is shown in FIG. 5, to which reference is now made. In the embodiment of FIG. 5, a launching unit 56, comprising a distributor 60 and a launching manager 62, replaces signal capturer 52. Furthermore, the recognition application is a matching module 64 which provides the results of its pattern matching to launching manager 62 and the pointing device, labeled 58, can be any type of pointing device.

Distributor 60 captures the output of pointing device 58 and provides it to one or both of launching manager 62 and operating system 50. If launching manager 62 is active and if it has received the activation signal, it will provide the output of pointing device 58 to matching module 64. If no activation signal has been received, launching manager 62 will ignore the output of pointing device 58.

Matching module 64 both attempts to match the pattern from pointing device 58 to a library 66 of patterns associated therewith and accepts patterns to be placed into library 66, in an action known as "training". The library 66 comprises patterns trained by the user and an identifier for the pattern. The results of the match (either a rejection or the identifier) are provided back to launching manager 62 which converts the identifier to a "launch application" command. The identifier can either be an alphanumerical identifier or a string associated with the command. In either case, launching manager 62 provides the command associated with the pattern to operating system 50. Launching manager 62 then ignores further input patterns until it receives a further activation signal.

Figure 6:
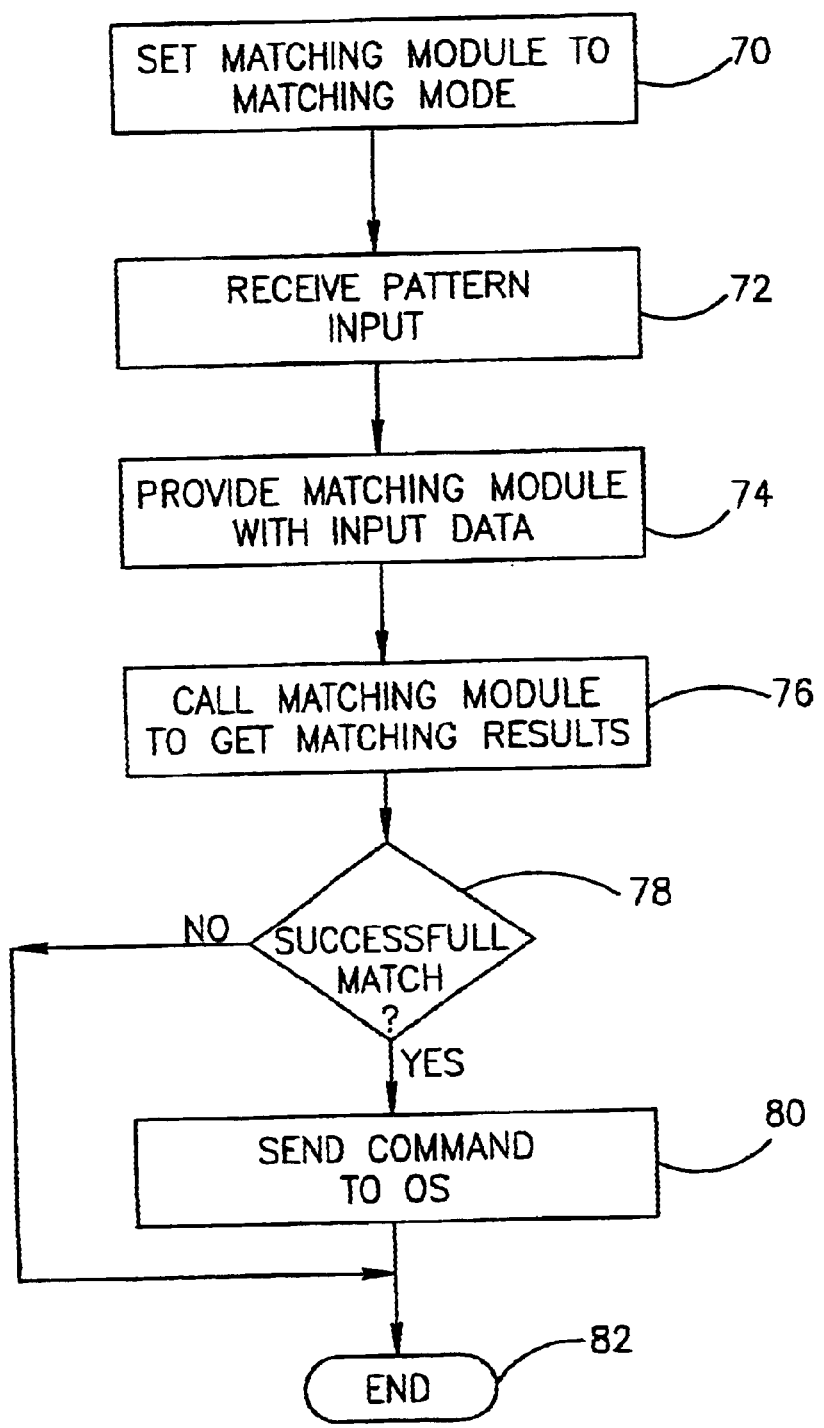
FIG. 6 is a flow chart illustration of a recognition method, useful in the system of FIG. 4.
Figure 7:
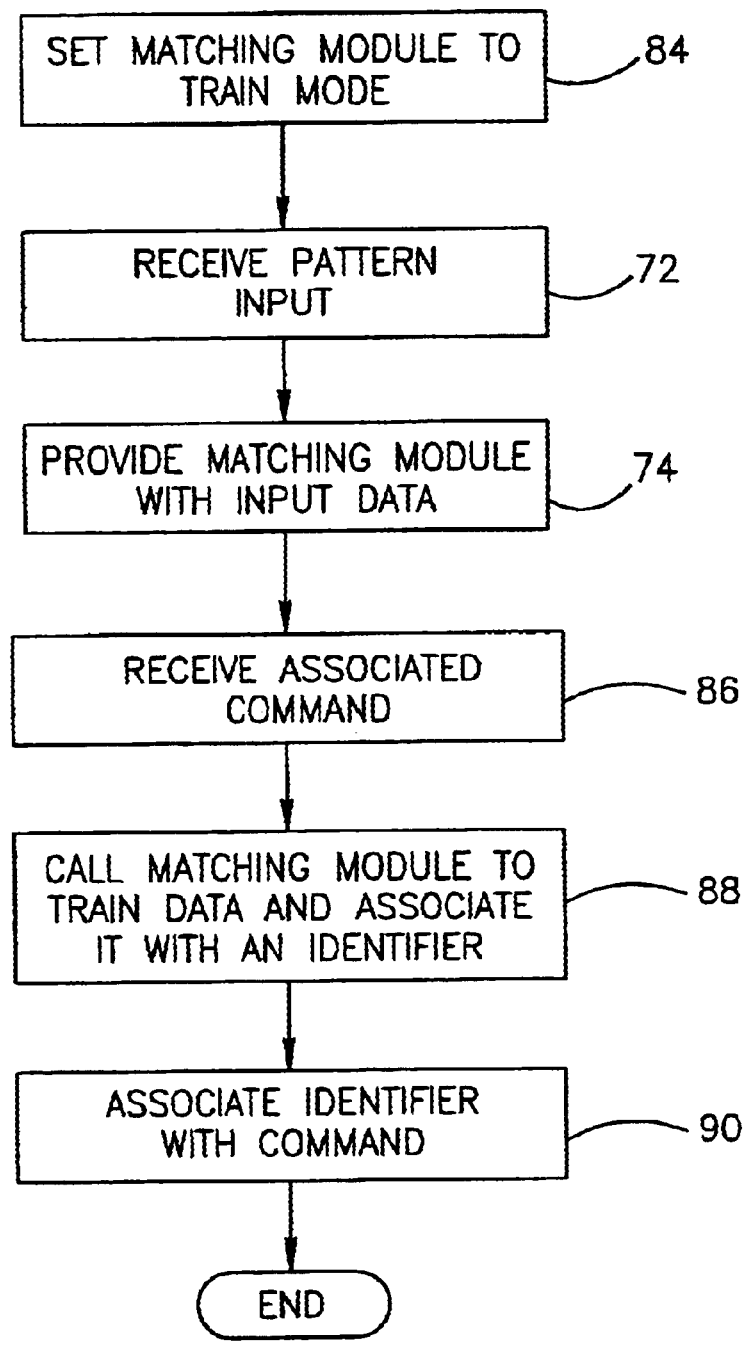
FIG. 7 is a flow chart illustration of a training method, useful in the system of FIG. 4.

FIGS. 6 and 7 illustrate the method performed by distributor 60, launching manager 62 and matching module 64 during recognition and pattern training, respectively. The recognition method of FIG. 6 begins by setting, in step 70, matching module 64 to the matching mode. The pattern data is then received (step 72) and provided (step 74) to matching module 64.

In step 76, launching manager 62 calls matching module 64 to perform the recognition and to return the match results. If the match was successful, as checked in step 78, launching manager 62 determines the associated command and sends the launch application command to operating system 50.

The training method of FIG. 7 begins by setting, in step 84, matching module 64 to the training mode. The pattern data is then passed to matching module 64 as in the recognition method. Launching manager 62 also receives an associated command in step 86.

In step 88 launching manager 62 calls matching module 64 to train the pattern and to associate it with an identifier. Step 90, in which the identifier is associated with the command, can be performed by matching module 64 or by launching manager 62.

It will be appreciated that the system of FIG. 5 can also operate with a voice input pattern. In this embodiment, the pointing device 58 is replaced by a microphone and the matching module is a voice pattern matching module. The remaining elements operate as described hereinabove.

It will be appreciated by persons skilled in the art that the present invention is not limited to what has been particularly shown and described hereinabove. Rather the scope of the present invention is defined only by the claims which follow.

What is claimed is:

1. An application launching system comprising:

a computer;

a touchpad pointing device in operative communication with said computer;

a launching manager operative to receive an activation signal and thereafter operate said touchpad pointing device in a pattern input mode and receive a pattern input via said touchpad pointing device; and pattern matching means operative to:

receive said pattern from said launching unit while said touchpad pointing device is in said pattern input mode;

compare said pattern to at least one preprogrammed pattern; and provide an identifier associated with said pattern to said launching manager where said input matches said preprogrammed pattern, wherein said launching manager is operative to identify an application on said computer that is in predefined association with said identifier and launch said application.

2. A system according to claim 1 wherein:

said touchpad pointing device is operative in a pointing device mode prior to said launching manager receiving said activation signal; and said launching manager is additionally operative to return said touchpad pointing device to said pointing device mode upon launching said application.

3. A system according to claim 1 and further comprising training means operative to create a plurality of said predefined association between a plurality of said application and a plurality of said identifier.

4. A system according to claim 1 wherein said launching manager is operative to receive a deactivation signal and thereafter operate said touchpad pointing device in a pointing device input mode.

5. A system according to claim 4 wherein said deactivation signal is any of a hot-key entry, a menu selection, and a termination directive to said recognition apparatus.

6. A system according to claim 1 wherein said activation signal is any of a hot-key entry, a menu selection, a voice command, and a hand-written pattern.

7. A system according to claim 1 wherein said pattern is any of a word, gesture, a character, and a signature.

8. A system according to claim 1 wherein said pattern is handwritten.

9. A system according to claim 1 wherein said application is a security application enabling further access to said computer.

10. A system according to claim 1 wherein said touchpad pointing device is either of a touchpad and a mouse.

* * * * *